G. F. MURPHY.
VEHICLE SEAT.
APPLICATION FILED OCT. 31, 1913.
1,105,822. Patented Aug. 4, 1914.
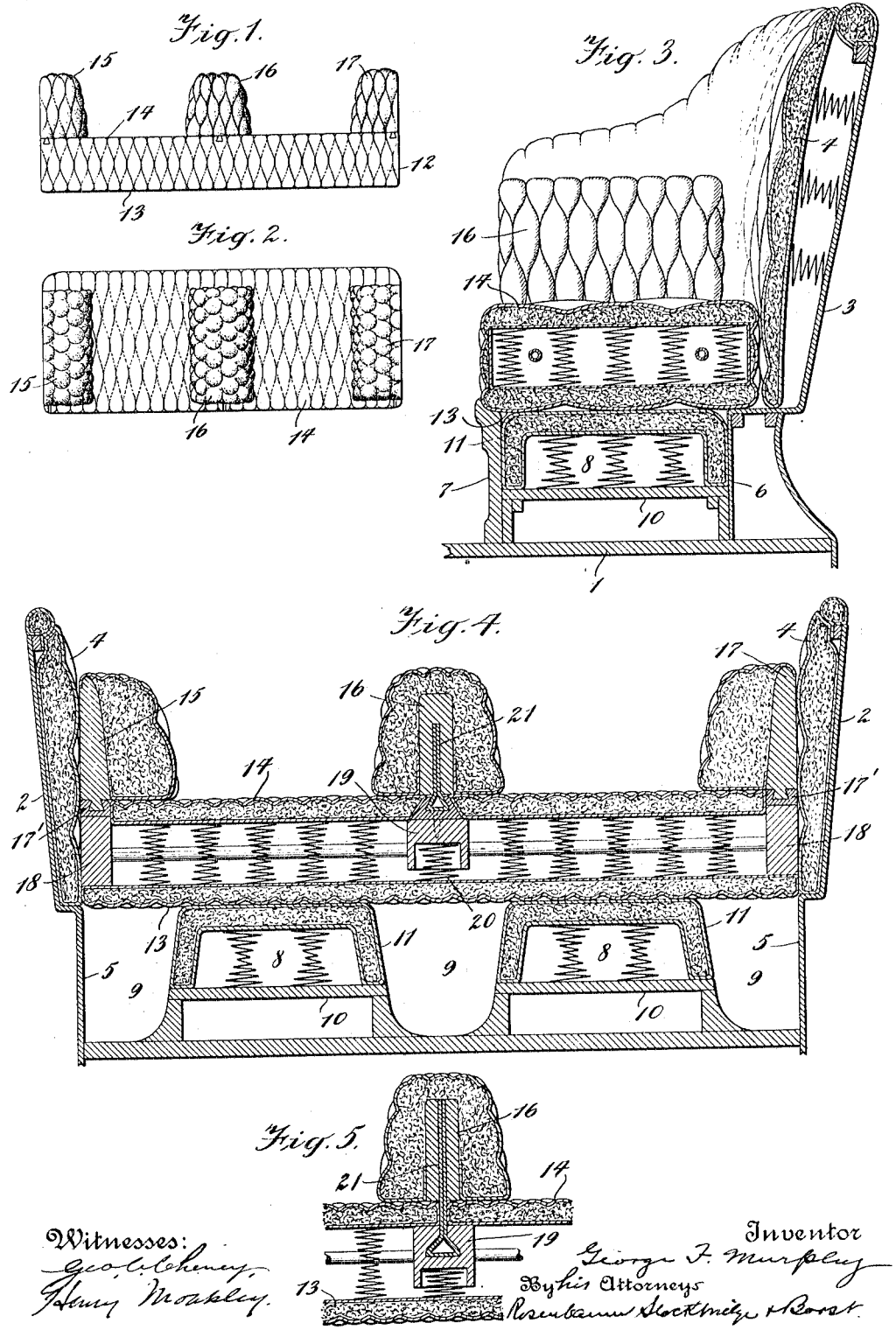

UNITED STATES PATENT OFFICE.

GEORGE F. MURPHY, OF NEW YORK, N. Y.

VEHICLE-SEAT.

1,105,822.   Specification of Letters Patent.   Patented Aug. 4, 1914.

Application filed October 31, 1913. Serial No. 798,454.

*To all whom it may concern:*

Be it known that I, GEOGRE F. MURPHY, a citizen of the United States, residing in the city of New York, borough of Brooklyn, and State of New York, have invented certain new and useful Improvements in Vehicle-Seats, of which the following is a full, clear, and exact description.

This invention relates to vehicle seats and more particularly to seats adapted for use in automobile tonneaus.

Where the ordinary form of seat of this character, which is usually of sufficient width to comfortably accommodate three adults, is occupied by one or two persons, the jolting and swerving of the car will cause the occupants to slide on the seat, crowding them against each other or against the sides of the tonneau, unless they maintain themselves in place on the seat by continually clinging to straps fastened to the sides of the body of the tonneau. To offset the resulting discomfort and annoyance, it has been proposed to construct the seat with separate seating compartments or saddle seats, but this construction is objectionable as the arms or partitions between the seats are permanent and the seat can never be occupied by more than a specified number of persons.

The primary object of my invention, therefore, is to overcome these objections and to provide a seat in which the size of the seating compartment may be easily and conveniently varied to adapt the seat to the number of persons who are to occupy it.

Another object of my invention is to provide a seat with separate seating compartments, the dimensions of which may be changed to fit the individuals who are to occupy the same.

With these objects in view, my invention primarily consists of a reversible seat having arms or partitions projecting from its reverse face or seating surface, dividing it into a plurality of separate seating compartments. This seat is supported by a suitable seat body provided with pockets or recesses into which the arms fit when the front face of the seat is being used. My invention also comprehends detachably securing the arms to the seat where by removing one or more of the arms, the dimensions of the seating compartment may be varied at will.

In the drawings, Figure 1 is a side elevation of my improved form of reversible seat; Fig. 2 is a plan of Fig. 1; Fig. 3 is a vertical longitudinal sectional view through a portion of the tonneau of an automobile with the seat positioned therein; Fig. 4 is a transverse section similar to Fig. 3; and Fig. 5 is a detail of a modification of the means for attaching the arms to the seat.

To the floor 1 of the chassis of an automobile is secured the sides 2 and back 3 of the body of the tonneau, which are spring upholstered, as at 4, in the usual manner. The lower portions 5 and 6 of the sides and back of the tonneau form with a frontboard 7, a box-like structure, which, in the ordinary construction of the seat, is utilized together with a removable top or cover to form the body of the seat upon which the seat cushion is placed. In the present construction, instead of providing a top for this box-like structure, two resilient seat supporting members 8 are positioned therein, which members are spaced from each other and from the side portions 5 of the body of the tonneau, providing recesses or pockets 9. Each member 8 comprises a plate 10 suitably supported from the floor 1, on which plate is arranged an upholstered spring cushion 11 providing a relatively broad supporting surface for the seat. While the form of seat supporting member illustrated is found to be preferable, yet it is obvious that the structure is susceptible to various modifications, the essential feature being that pockets or recesses 9 will be provided in the seat body, into which the arms of a reversible seat 12 are adapted to fit.

The seat 12 is of the usual spring upholstered type having two opposite faces or seating surfaces 13 and 14. Projecting from the reverse face 14, are arms 15, 16 and 17, which divide it into two separate seating compartments, each of a size to accommodate one person. These arms are preferably heavily upholstered and are of the proper dimensions to fit into the pockets 9, with the top of the upholstered portion of the arms resting directly on the bottom of the pockets, thus furnishing an extra support for the seat when the front face 13 of the seat is being used. However, when the reverse face 14 is being used, the resilient supporting members 8 are positioned directly beneath the seating compartments and will furnish adequate support for the weight of the persons occupying the seat.

The arms 15, 16 and 17, are preferably made detachable from the seat. One means for accomplishing this is to dove-tail the lower ends of the arms into sockets or slides 17' carried by blocks or frame pieces 18 which connect the two faces of the seat. The center or intermediate block 19 is preferably supported by a spring 20 to add the desired resiliency to the middle portion of the seat. Instead of forming the male member of the dove-tail joint integral with the arms 15, 16 and 17, a strip of metal 21 may be bent into the shape shown and used in place thereof.

In Fig. 5 is shown a somewhat modified construction in which the block 19 is arranged below the upholstering of the seat, which will allow the separate upholstered cushions to abut each other when the arm is removed, thereby insuring that the seat will have no hard surfaces to contact with the body of the occupant when the arms have been removed.

By making the arms detachable, it is not necessary to reverse the seat to change the size of the seating compartments, but the arms may be removed and stored in the pockets 9, but the main advantage of making the same detachable is that the dimensions of the seating compartments may be changed to accommodate persons of different sizes, for if the seat is to be occupied by an extremely large person, one of the side arms 15 or 17 may be removed, thus giving an added seating surface to properly accommodate the occupant. It will therefore be evident that the size of the seat may be varied by removing one or more of the arms to comfortably accommodate from one to three persons irrespective of their size, and the arms, when in place, will act as barriers or guards to prevent the occupants from sliding on the seat when the seat is occupied by one or two persons.

While the arms 15 to 17 are preferably made detachable yet for ordinary purposes, it will suffice to make the seat reversible, as the seating compartments provided on the reverse face of the seat are each of a size to comforatbly accommodate one person, and by merely reversing the seat, the capacity of the seat can be changed to accommodate a greater number of occupants.

While I have shown my invention in connection with a vehicle seat, it is not my intention to limit the invention thereto, as it is manifest that the invention is capable of adaptation wherever it is desired to provide a seat which by reversing the same, separate seating compartments may be provided for one or more persons.

Having described my invention, I claim:—

1. A reversible seat provided on both faces with upholstery or other seating surface and having on one face only an arm dividing the seating surface into a plurality of individual seating spaces.

2. A reversible seat provided on both faces with upholstery or other seating surface and having on one face only an arm dividing the seating surface into a plurality of individual seating spaces, in combination with a seat support provided with a pocket adapted to receive said arm when the latter is directed downward.

In witness whereof, I subscribe my signature in the presence of two witnesses.

GEORGE F. MURPHY.

Witnesses:
  WALDO M. CHAPIN,
  REUBEN LADER.